(12) United States Patent
Durrani et al.

(10) Patent No.: US 10,160,290 B2
(45) Date of Patent: Dec. 25, 2018

(54) MODULAR DESIGNED HIGH PERFORMANCE HEAT PUMP SYSTEM FOR A VEHICLE WITH LOW WASTE HEAT RADIATION

(71) Applicant: Hanon Systems, Daejeon (KR)

(72) Inventors: Navid Durrani, Elsdorf (DE); Roberto Della Rovere, Kerpen (DE); Marc Graaf, Krefeld (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/217,013

(22) Filed: Jul. 22, 2016

(65) Prior Publication Data

US 2017/0021695 A1    Jan. 26, 2017

(30) Foreign Application Priority Data

Jul. 23, 2015   (DE) .......................... 10 2015 112 030

(51) Int. Cl.
   *B60H 1/00*   (2006.01)

(52) U.S. Cl.
   CPC ..... B60H 1/00921 (2013.01); *B60H 1/00064* (2013.01); *B60H 1/00278* (2013.01); *B60H 1/00385* (2013.01); *B60H 2001/00178* (2013.01); *B60H 2001/00307* (2013.01)

(58) Field of Classification Search
   CPC ............ B60H 1/00921; B60H 1/00278; B60H 2001/00307; B60H 2001/00178
   See application file for complete search history.

(56) References Cited

U.S. PATENT DOCUMENTS

| | | | | |
|---|---|---|---|---|
| 6,047,770 A | * | 4/2000 | Suzuki | B60H 1/00007 165/202 |
| 2002/0095943 A1 | * | 7/2002 | Hatakeyama | B60H 1/00007 62/324.1 |
| 2011/0016896 A1 | * | 1/2011 | Oomura | B60H 1/00785 62/155 |

(Continued)

FOREIGN PATENT DOCUMENTS

| | | |
|---|---|---|
| DE | 102012111672 A1 | 10/2013 |
| DE | 102012108891 A1 | 3/2014 |

(Continued)

*Primary Examiner* — Kun Kai Ma
(74) *Attorney, Agent, or Firm* — James D. Miller; Shumaker, Loop & Kendrick, LLP (57) ABSTRACT

An air conditioning system for conditioning air of a passenger compartment of a motor vehicle. The air conditioning system operable in a cooling mode, a heat pump mode, and a reheating mode, the system includes an enclosure with a first flow channel and a second flow channel conducting air, and a refrigerant circulation system with a heat exchanger operable as an evaporator independent of the operating mode and a heat exchanger operable as a condenser independent of the operating mode. Both heat exchangers are located inside the enclosure. The refrigerant circulation system also includes a heat exchanger outside of the enclosure and inside the refrigerant path, an expansion element upstream from the evaporator in the flow direction of the refrigerant, and a bypass parallel to the refrigerant path to channel the refrigerant around the heat exchanger as needed.

10 Claims, 7 Drawing Sheets

(56) References Cited

U.S. PATENT DOCUMENTS

| | | | | |
|---|---|---|---|---|
| 2011/0048671 | A1* | 3/2011 | Nishikawa | B60H 1/00885 165/42 |
| 2012/0102974 | A1* | 5/2012 | Kawazoe | B60H 1/00035 62/3.61 |
| 2012/0227431 | A1* | 9/2012 | Wang | B60H 1/00921 62/238.7 |
| 2012/0253573 | A1* | 10/2012 | Shigyo | B60H 1/00421 701/22 |
| 2012/0255319 | A1* | 10/2012 | Itoh | F24F 3/1405 62/160 |
| 2013/0055751 | A1* | 3/2013 | Inaba | B60H 1/2218 62/498 |
| 2013/0227973 | A1* | 9/2013 | Kang | F25B 47/022 62/80 |
| 2014/0075973 | A1* | 3/2014 | Graaf | B60H 1/00328 62/115 |
| 2014/0102666 | A1* | 4/2014 | Ichishi | B60H 1/00828 165/11.1 |
| 2014/0360215 | A1* | 12/2014 | Inaba | B60H 1/3207 62/216 |
| 2014/0373563 | A1* | 12/2014 | Mizutani | B60H 1/00807 62/186 |
| 2016/0229266 | A1* | 8/2016 | Maeda | B60H 1/0005 |
| 2017/0021700 | A1* | 1/2017 | Smith | B60H 1/3225 |
| 2017/0174045 | A1* | 6/2017 | Shimauchi | B60H 1/00064 |
| 2017/0274733 | A1* | 9/2017 | Suzuki | B60H 1/00978 |

FOREIGN PATENT DOCUMENTS

| | | |
|---|---|---|
| EP | 2716478 A1 | 4/2014 |
| KR | 20080009398 A | 1/2008 |
| KR | 1020120103054 A | 9/2012 |
| KR | 20140114471 A | 9/2014 |
| KR | 20150039545 A | 4/2015 |

\* cited by examiner

MODULAR DESIGNED HIGH PERFORMANCE HEAT PUMP SYSTEM FOR A VEHICLE WITH LOW WASTE HEAT RADIATION

CROSS-REFERENCE TO RELATED PATENT APPLICATION

This patent application claims priority to German Patent Application No. DE 102015112030.5 filed on Jul. 23, 2015, the disclosure of which is incorporated herein by reference in its entirety.

FIELD OF THE INVENTION

The invention relates to an air conditioning system for the conditioning of the air of a passenger compartment of a motor vehicle, designed for operation in a cooling mode, a heat pump mode, as well as in a reheating mode. The air conditioning system features an enclosure with a first and a second flow channel for the conduction of air, as well as a refrigerant circulation system, which features a heat exchanger that can be operated as an evaporator independent of the operating mode, as well as a heat exchanger that can be operated as a condenser independent of the operating mode, which are located inside the enclosure. Furthermore, the refrigerant circulation system features a heat exchanger outside of the enclosure, which is located outside of the enclosure and inside of the refrigerant path of the refrigerant circulation system.

BACKGROUND OF THE INVENTION

Air conditioning systems that have long since existed as prior art condition the air channeled into the passenger compartment by absorbing the heat required for heating the air mass flow from various heat sources in the heat pump mode or in the reheating mode.

On the one hand, when ambient temperatures are low, for instance, lower than −10° C., air conditioning systems of this type, with coolant-air-heat exchangers which derive their heating action from the coolant circulation system of an efficient combustion engine of the vehicle drive, no longer reach the temperature level necessary for the comfortable heating of the passenger compartment. The same is true for systems in vehicles with a hybrid engine; for these vehicles, the use of reheating concepts is necessary. On the other hand, heat is extracted from the coolant, so that the combustion engine is operated for extended periods at low temperatures, which has a negative effect on exhaust emissions and fuel consumption. Based on the intermittent use of the combustion engine in hybrid vehicles, a sufficiently high coolant temperature is no longer achieved during long drives. As a result, the start-stop operation of the combustion engine is discontinued at low ambient temperatures. The combustion engine is not switched off.

Furthermore, there is a trend towards a full electrification of the engine, for instance in vehicles operated by batteries or fuel cells. In such vehicles, waste heat from the combustion engine is eliminated as a possible source for heating the air.

Moreover, the amount of energy that can be stored in the battery of the vehicle is lower than the amount of energy that can be stored in the form of liquid fuel inside the fuel tank. As a result, the power needed for air conditioning the passenger compartment of an electrically powered vehicle has a considerable effect on the range of the vehicle.

Known from prior art are air conditioning system for vehicles for combined operation in cooling and heat pump mode in order to heat, cool, and dehumidify the conditioned air channeled into the passenger compartment.

Similarly, air conditioning system with a heat pump mode are known, in which the evaporator can be operated as an evaporator in cooling mode as well as in heat pump mode, and in which the condenser can be operated as a condenser in cooling mode as well as in heat pump mode. These air conditioning systems are controlled either via the refrigerant circulation system and/or via the air.

From DE 10 2012 108 891 A1 we learn about an air conditioning system for the conditioning of the air in a passenger compartment. The air conditioning system designed for the cooling and heating of the passenger compartment as well as for reheating features an enclosure with two flow channels for the conduction of air, as well as a refrigerant circulation system with an evaporator and a condenser, wherein the evaporator is located in the first flow channel and the condenser is located in the second flow channel. The setting of the operating mode is solely done via the control of the air flow devices. The heat exchanger, evaporator, or condenser are respectively positioned with a part of the heat transferring surface in the first as well as in the second flow channel, whereas the part of the heat transferring surface necessary for the respective operating mode can be adjusted by means of the air-receiving air flow devices.

The air conditioning system with an enclosure embodied as a single module with in it an integrated refrigerant circulation system features a low weight with short and rigid refrigerant ducts, which prevents external leaks almost entirely. The system is designed to allow switching between various operating modes without switching valves. When in heat pump mode in order to heat the passenger compartment, the air sucked out of the passenger compartment can be used for the evaporation of the refrigerant.

However, preferentially, the system is operated with two blowers, since both the evaporator in the first flow channel and the condenser in the second blow channel, and therefore, each of two independent modules, features one respective blower. The airstream of the vehicle cannot be utilized for the incident flow of the condenser, and therefore, for the heat dissipation from the refrigerant circulation system when operating in cooling mode, so that the blower propagating the air through the second flow channel is continuously in operation. The blower is also operated during the movement of the vehicle, so that the efficiency of the air conditioning system is therefore lower than that of conventional systems, in particular when operating in cooling mode.

In DE 10 2012 111 672 A1, a refrigerant circulation system of an air conditioning system is described for the conditioning of air in a passenger compartment of a motor vehicle. The refrigerant circulation system designed for combined operation in cooling and in heat pump mode as well as in reheating mode features a compressor, a heat exchanger for transferring heat between the refrigerant and the surroundings, a first expansion element, and a heat exchanger for transferring heat from the conditioned air in the passenger compartment to the refrigerant, a heat exchanger for transferring heat from the refrigerant to the conditioned air in the passenger compartment, and a second expansion element post-positioned in the flow direction of the refrigerant. The refrigerant circulation system is embodied to include a third expansion element with an adjustable flow area, which is configured and positioned in the refrigerant circulation system such that in a fully opened position, flow-through of refrigerant free of pressure loss is guaranteed, and such that with a reduction of the flow area, the pressure level in the heat exchanger for transferring heat from the refrigerant to the conditioned air in the passenger compartment can be adjusted via the pressure level in the heat exchanger for transferring heat from the refrigerant to the surroundings. The heat exchanger for transferring heat between the refrigerant and the surroundings, which receives air from the surroundings, is positioned in the front of the vehicle and can take in air from the airstream of the vehicle. When operating in cooling mode, the heat exchanger is operated as a condenser for dissipating heat from the condensing refrigerant to the surroundings, and when operating in heat pump mode, it is operated as an evaporator in order to absorb ambient heat. In particular when operating in heat pump mode at ambient air temperatures below the freezing point, the evaporation temperature is below the freezing point. When operating at temperatures below the dew point temperature, humidity from the air accumulating on the surface of the heat exchanger operating as an evaporator will freeze when the surface temperature falls below freezing temperature. The ice layer accumulating on the surface of the heat exchanger will grow, which has an adverse impact on the heat transfer, and therefore leads to a reduction of the power of the heat exchanger, and adversely impacts the efficiency of the air conditioning system.

In EP 2 716 478 A1, an air conditioning system for a motor vehicle with an enclosure featuring two flow channels separated from each other by means of a separation wall and a refrigerant circulation system are described. The refrigerant circulation system features two heat exchangers located inside the enclosure, as well as a heat exchanger located outside the enclosure. The heat exchanger located outside the enclosure can be operated between the ambient air and the refrigerant for heat absorption as well as for heat dissipation. The heat exchanger positioned inside the second flow channel can serve as a condenser for heat dissipation to, or as an evaporator for heat absorption from the refrigerant.

The systems known from DE 10 2012 108 891 A1, DE 10 2012 111 672 A1, and EP 2 716 478 A1 are what is known as air-to-air heat pumps, in which both the heat source and the heat sink is air.

SUMMARY OF THE INVENTION

The task of the present invention is to provide an air conditioning system with a heating function, specifically for use in motor vehicles. Furthermore, the system should be designed to allow for a combined operation in cooling mode, heat pump mode, and reheating mode for the heating, cooling, and dehumidifying of the conditioned air in the passenger compartment. Operation should also be possible in environments with low capacity heat sources, such as energy-efficient combustion engines or hybrid engines consisting of a combustion engine and an electric motor, or in the absence of engine heat sources, as in electrically powered vehicles, and meet all the requirements for providing a comfortable climate in the passenger compartment. This comfort must be continuously sustainable, independent of the operating mode. In particular, a loss of heating power is to be avoided.

The task is accomplished by the subject and the characteristics as described herein.

The task is accomplished by way of an air conditioning system for the conditioning of the air of a passenger compartment of a motor vehicle according to the invention. The air conditioning system, which is designed for operation in a cooling mode, a heat pump mode, as well as in a reheating mode, features an enclosure with a first and a second flow channel for the conduction of air, as well as a refrigerant circulation system.

The refrigerant circulation system features a heat exchanger that can be operated as an evaporator independent of the operating mode, as well as a heat exchanger that can be operated as a condenser independent of the operating mode, which are located inside the enclosure. Furthermore, the refrigerant circulation system is embodied with a heat exchanger outside of the enclosure, which is located outside of the enclosure and inside of the refrigerant path of the refrigerant circulation system, as well as an expansion element positioned in the flow direction of the refrigerant, upstream from the evaporator.

In the "reheat" or reheating mode, the air that is fed into the passenger compartment is cooled and dehumidified. Subsequently, the dehumidified air is slightly heated. In this operating mode, the reheating effort is usually smaller than the cooling effort needed for the cooling and dehumidification of the air.

According to the concept of the invention, the refrigerant circulation system features a bypass positioned parallel to the refrigerant path, so that the refrigerant can be channeled around the heat exchanger located outside of the enclosure, as needed. Preferentially, the heat exchanger located outside of the enclosure is embodied as a refrigerant-air heat exchanger.

Furthermore, the air conditioning system advantageously features air flow devices for opening and closing sections of the enclosure such as the first flow channel and the second flow channel, and with a single blower for the propagation of an air mass flow through the enclosure. The air mass flows through the flow channels are therefore solely controlled by means of the air flow devices, which are advantageously embodied as valves, in combination with the rotational speed of the blower.

The condenser of the refrigerant circulation system is preferentially located inside the second flow channel of the enclosure. When operating a heat exchanger as a condenser in the supercritical range, for instance inside a refrigerant circulation system with carbon dioxide as a refrigerant, the condenser is always also referred to as a gas cooler.

According to an advantageous embodiment of the invention, the flow channel features an air flow device and a cold air flow path in the flow direction of the air downstream from the evaporator, such that a conditioned air mass flow channeled through the first flow channel can be divided into partial air mass flows. Specifically, a first partial air mass flow may be channeled via a cold air flow path into the passenger compartment, and a second partial air mass flow may be channeled via a cold air flow path into the surroundings of the enclosure.

The device for diverting the air into the surroundings of the enclosure is envisioned solely in the range of the first flow channel, so that only via the evaporator the therefore cooled and/or dehumidified air can be channeled into the surroundings. In comparison, the second flow channel, being a hot air flow path, does not provide a path for channeling air into the surroundings of the enclosure.

According to a first alternative embodiment of the invention, the evaporator is positioned so as to cover the entire flow area of the enclosure, before an entrance into the first flow channel and an entrance into the second flow channel. As a result, and air mass flow propelled by the blower is channeled via the evaporator in its entirety.

According to a second alternative embodiment of the invention, the enclosure features a bypass around the evaporator. The bypass features an air flow device for opening and closing, so that when the air flow device is open, an air mass flow propelled by the blower can be channeled around the evaporator via the bypass.

The air mass flow channeled around the evaporator is advantageously channeled directly into the second flow channel, and therefore directly to the condenser located inside the second flow channel.

The refrigerant circulation system advantageously features a bypass around the evaporator which is located inside the enclosure, so that the refrigerant can be channeled around the evaporator as needed.

In a preferred embodiment of the invention, the refrigerant path of the refrigerant circulation system, which features the heat exchanger located outside of the enclosure, features an expansion element. The expansion element is positioned in the flow direction of the refrigerant, upstream from the heat exchanger.

Advantageously, the heat exchanger may be operated as a condenser or as an evaporator, as needed.

A method for the operation of the air conditioning system according to the first alternative embodiment for a combined operation in cooling mode and in heat pump mode for cooling and for heating, as well as for operation in a reheating mode for the conditioning of the air of a passenger compartment of a motor vehicle, includes the following steps:

In heat pump mode: propagating an air mass flow in an enclosure of the air conditioning system through a second flow channel with inside it a condenser of a refrigerant circulation system for the transfer of heat from the refrigerant to the air mass flow into the passenger compartment, while a first flow channel of the enclosure is closed, thereby conducting the refrigerant via a refrigerant path of a refrigerant circulation system with an expansion element and an external heat exchanger, in which the expansion element is operated for the discharge of the refrigerant and the external heat exchanger is operated as an evaporator for the absorption of heat from the ambient air, and conducting the refrigerant via a bypass around an evaporator located inside the enclosure, so that the evaporator is not impinged with refrigerant, switching the operation from heat pump mode to reheating mode, in reheating mode: propagating the air mass flow in the enclosure via the evaporator of the refrigerant circulation system for the transfer of heat from the air mass flow to the refrigerant, while the air mass flow is cooled and/or dehumidified when flowing over the evaporator, dividing the cooled and/or dehumidified air mass flow into a partial air mass flow which is channeled into the surroundings and/or into the passenger compartment, and into a partial air mass flow for reheating, heating the partial air mass flow for reheating when flowing over the condenser, whereby the heat absorbed in the evaporator from the refrigerant is dissipated in the condenser, channeling the heated partial air mass flow into the passenger compartment, thereby opening a sealing valve located inside the bypass around the refrigerant path with the external heat exchanger, and conducting the refrigerant through the bypass around the external heat exchanger to an expansion element in order to discharge the refrigerant, configuring a three-way valve such that the bypass around the evaporator located inside the enclosure is closed, and that the evaporator is impinged with refrigerant.

The switch from operation in heat pump mode to operation in reheating mode is such that the heat transfer surface of the external heat exchanger operated as an evaporator does not ice over.

The heat exchanger of the second alternative embodiment of the invention which is positioned outside of the enclosure is embodied as only operational as a condenser, independent of the operating mode.

A method for the operation of the air conditioning system according to the second alternative embodiment for a combined operation in cooling mode and in heat pump mode for cooling and for heating, as well as for operation in a reheating mode for the conditioning of the air of a passenger compartment of a motor vehicle, includes the following steps:

In heat pump mode: propagating an air mass flow in an enclosure of the air conditioning system dividing the air mass flow into a partial air mass flow for the dissipation of heat to a refrigerant, which is channeled via an evaporator of a refrigerant circulation system and then into the surroundings in its entirety, and into a partial air mass flow for reheating, which is channeled through a bypass around the evaporator into a second flow channel with inside it a condenser of the refrigerant circulation system for the transfer of heat from the refrigerant to the partial air mass flow, and then into the passenger compartment, thereby conducting the refrigerant via a bypass around a heat exchanger located outside the enclosure to an expansion element for the discharge of the refrigerant, and through the evaporator for heat absorption, switching the operation from heat pump mode to reheating mode, in reheating mode: propagating the air mass flow in the enclosure via the evaporator of the refrigerant circulation system for the transfer of heat from the air mass flow to the refrigerant, while the air mass flow is cooled and/or dehumidified when flowing over the evaporator, closing an air flow device of the bypass around the evaporator, and opening an air flow device in the air flow direction downstream from the evaporator, dividing the cooled and/or dehumidified air mass flow into a partial air mass flow which is channeled into the surroundings, and into a partial air mass flow for reheating, which is channeled into the second flow channel with inside it a condenser for the transfer of heat from the refrigerant to the partial air mass flow, and then into the passenger compartment According to a further development of the invention, the air conditioning system features a coolant circulation system with a propagation device for circulating the coolant, a coolant-air heat exchanger for the dissipation of heat from the coolant to the ambient air, as well as a coolant heat source for the absorption of heat by the coolant. Preferentially, the coolant heat source serves for the cooling of a motor engine or a battery of a motor vehicle.

The coolant circulation system advantageously features a bypass around the coolant-air heat exchanger.

According to a first alternative embodiment of the invention, the coolant circulation system features a heating heat exchanger for the transfer of heat from the coolant to the to the air channeled into the passenger compartment, whereby the heating heat exchanger is located in the second flow channel of the enclosure.

The heating heat exchanger is advantageously positioned here upstream from the condenser of the refrigerant circulation system in the flow direction of the air.

According to a second alternative embodiment of the invention, the coolant circulation system features a heating heat exchanger for the transfer of heat from the coolant to the to the air channeled into the passenger compartment, whereby the heating heat exchanger is located in the first flow channel of the enclosure.

The coolant circulation system here advantageously features a bypass around the heating heat exchanger.

In a further preferential embodiment of the invention, the coolant circulation system features a refrigerant-coolant heat exchanger designed for the transfer of heat from the coolant to the refrigerant. The refrigerant-coolant heat exchanger is operated here as an evaporator of the refrigerant.

In summary, the solution according to the invention features various advantages:
- an efficient air conditioning system for simultaneous dehumidification and heating with all the advantages of the systems known from prior art with two independent blowers, which features, in contrast, a single blower only;
- utilization of the airstream of the motor vehicle for the impingement of the external heat exchanger operated as a condenser when in cooling mode for the purpose of heat dissipation from the refrigerant circulation system, without the use of an additional blower, which leads to an increased efficiency of the air conditioning system as compared to conventional systems, in particular when operating in cooling mode;
- rapid provision of warm air at low ambient temperatures and cold engine coolant in vehicles with a combustion engine;
- suitability for use in motor vehicles with a low degree of heat waste, in particular of engine heat, preferably in motor vehicles with a hybrid engine, or engines without combustion engines such as electrically powered vehicles or vehicles powered by fuel cells;
- reduction of the power required for heating the passenger compartment through the use of ambient air and/or through focused guidance of air within the flow channels;
- diversion of air not needed in the passenger compartment into the surroundings;
- arrangement of the external heat exchanger, independent of the enclosure of the air conditioning system, and therefore avoidance of an impact on the construction volume of the enclose; as well as
- avoidance of the icing-over of the external heat exchanger, for instance by means of targeted switching between the operating modes of the air conditioning system, which also prevents a loss of heat supply to the passenger compartment, and
- a modular air conditioning system, which can be easily linked with high or low temperature coolant circulation systems, for instance in order to utilize the waste heat of a combustion engine or of electric components, in particular when operating in the heat pump mode, in which the ambient air does not have to be utilized as a heat source, and consequently, also no risk of icing of the external heat exchanger operated as an evaporator.

BRIEF DESCRIPTION OF THE DRAWINGS

Further details, characteristics, and advantages of the invention follow from the following description of exemplary embodiments, in reference to the respective drawings.

FIGS. 1 through 14 respectively show an air conditioning system with a blower, an enclosure featuring two flow channels, or a cold air and a hot air flow path, respectively, as well as two heat exchangers located inside the enclosure and one heat exchanger located outside of the enclosure, which can be operated as evaporators or as condensers. The respective enclosures are shown with a cold air flow path for the diversion of air into the surroundings. An air conditioning system with a refrigerant circulation system is shown in:

FIG. 1: with a bypass around the external heat exchanger and a bypass around the evaporator, as well as two expansion elements;

FIG. 2: according to FIG. 1, when operated in cooling mode;

FIG. 3: according to FIG. 1, when operated in heat pump mode;

FIG. 4: according to FIG. 1, when operated in reheating mode;

FIG. 5: with a bypass around the external heat exchanger and with an expansion element;

FIG. 6: according to FIG. 5, when operated in cooling mode;

FIG. 7: according to FIG. 5, when operated in heat pump mode;

FIG. 8: according to FIG. 5, when operated in reheating mode;

DESCRIPTION OF SPECIFIC EMBODIMENTS

Figure 1:
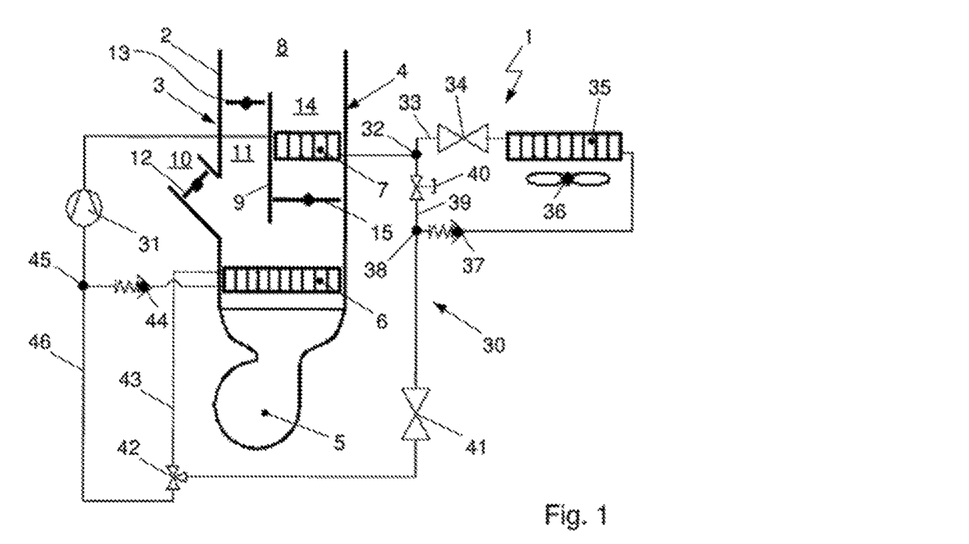

FIG. 1 shows an air conditioning system 1 with an enclosure 2, featuring a first flow channel 3 as well as a second flow channel 4, in which an air mass flow may be propelled by a blower 5 through the first flow channel 3 as well as through the second flow channel 4. The flow channels 3, 4 may receive fresh ambient air from the surroundings, circulating air from the passenger compartment 8, or a mixture of fresh ambient air and circulating air.

An evaporator 6 of a refrigerant circulation system 30 is positioned downstream from the blower 5 in the flow direction of the air. Downstream from the evaporator 6, the air mass flow may be distributed by air flow devices 12, 13, 15 between flow channels 3, 4. The first and the second flow channel 3, 4 are separated from each other by the separation wall 9.

The air flow device 13 serves for the purpose of opening and closing a cold air flow path 11, which extends through the first flow channel 3. By means of the air flow device 12, a certain part of the air mass flow that is conditioned as a result of flowing over the evaporator 6 can be diverted via the cold air flow path 10 from the air conditioning system 1 into the surroundings. The air flow device 15 serves for the purpose of opening and closing the entrance into the second flow channel 4. A condenser 7 of the refrigerant circulation system 30 is connected to the air flow device 15 and inside the second flow channel 4.

The evaporator 6 and the condenser 7 are each embodied as air-charged heat exchangers. The evaporator 6 extends here across the entire flow area of the flow channels 3, 4. Based on their position inside the flow channels 3, 4 and therefore inside the enclosure 2, the evaporator 6 and the condenser 7 are also referred to as internal heat exchangers.

The blower 5 sends the air taken in as an air mass flow to the evaporator 6. When flowing over the heat exchange surface of the evaporator 6, the air mass flow is cooled and/or dehumidified.

The cold air mass flow exiting from the evaporator 6 is guided as a partial air mass flow through the first flow channel 3 via the cold air flow path 11 in the direction of the passenger compartment 8, via the cold air flow path 10 in the surroundings of the air conditioning system 1, and/or through the second flow channel 4 in the direction of the passenger compartment 8. The cold air mass flow is either divided in the requisite ratio or channeled in its entirety to one of the cold air flow paths 10, 11 or to the warm air flow path 14 of the second flow channel 4. The cold air mass flow, in turn, is divided by the air flow devices 12, 13, which are embodied as valves.

When flowing over the heat exchange surface of the condenser 7, the partial air mass flow is heated.

In the flow direction of the refrigerant, the refrigerant circulation system 30 features a compressor 31, a condenser 7, as well as a branch 32. Departing from the branch 32, a first refrigerant path 33 with a first expansion element 34 which can be operated as an expansion element, specifically as an expansion valve, the heat exchanger 35 with a blower 36 located outside of the enclosure 2, as well as a first check valve 37, extends until an outlet point 38. Between the branch 32 and the outlet point 38, a first bypass 39 with a stop valve 40 is embodied parallel to the first refrigerant path 33.

In the flow direction of the refrigerant, after the outlet point 38, the refrigerant circulation system 30 also features a second expansion element 41 which can be operated as an expansion device, specifically as an expansion valve, as well as an additional branch embodied as a three-way valve 42.

Departing from the three-way valve 42, a second refrigerant path 43 with the evaporator 6 as well as with a second check valve 44 extends until an outlet point 45. Between the three-way valve 42 and the outlet point 45, a second bypass 46 is embodied parallel to the second refrigerant path 43.

In the flow direction of the refrigerant, the compressor 31 comes after the outlet point 45. The refrigerant circulation system 30 is closed.

Figure 2:
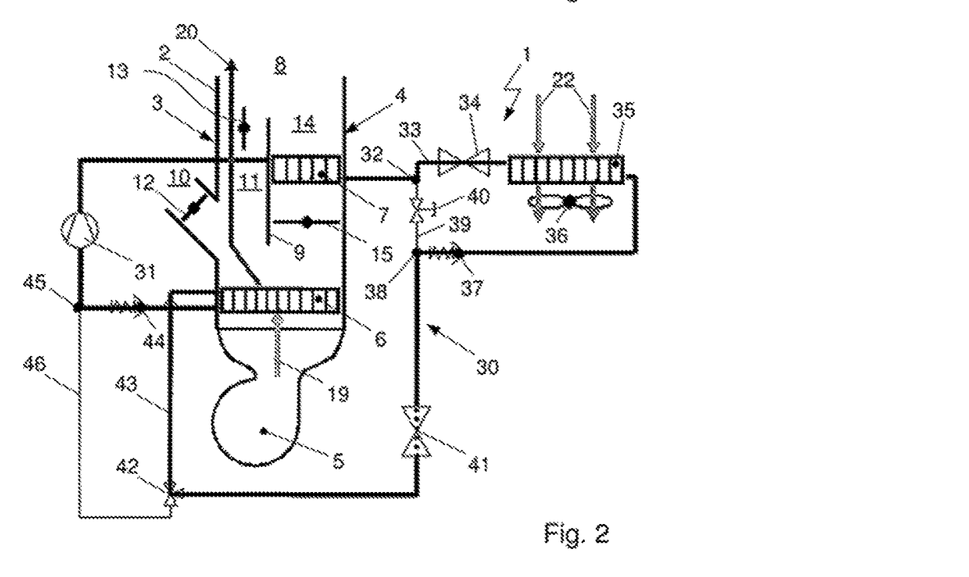

When operated in cooling mode according to FIG. 2, meaning that the air channeled into the passenger compartment 8 is cooled, the air flow devices 12, 15, and therefore the cold air flow path 10 and the warm air flow path 14 are closed. The air flow device 13 is aligned such that air mass flow that is taken in by the blower 5 is channeled through the cold air flow path 11 to the passenger compartment 8. The cold air flow path 11 is open.

The blower 5 propels the air mass flow that was taken in into the flow direction 19 towards the evaporator 6. When flowing over the heat exchanger surface of the evaporator 6, the air is cooled or dehumidified, respectively, and is then channeled in flow direction 20 through the first flow channel 3 through the cold air flow path 11 into the passenger compartment 8.

The heat absorbed from the refrigerant in the evaporator 6 is dissipated in the heat exchanger 35 that is integrated in the refrigerant circulation system 30. The heat exchanger 35 that is located outside of the enclosure 2 which, in cooling mode, is operated as a condenser, utilizes the ambient air as a heat sink. The positioning of the heat exchanger 35 at the front of the vehicle makes it possible for the heat transfer surface to take in the airstream, which improves the heat transfer process without the need for additional components, such as the blower 36. The blower 36 may be used as needed, for instance in a stationary vehicle, in order to propel the air mass flow flowing in the flow direction 22. Based on the arrangement outside of the enclosure 2, the heat exchanger is also referred to as an external heat exchanger.

In cooling mode, the refrigerant circulation system 30 is set such that the stop valve 40 closes the first bypass 39. The refrigerant flows through the first refrigerant path 33. The first expansion element 34 is fully opened, so that the refrigerant does not pass through a cross-sectional bottleneck and does not discharge.

The second expansion element 41 is used for discharging the condensed refrigerant at an evaporating pressure. The three-way valve 42 is set such that the refrigerant is taken in by the compressor 31 through the second refrigerant path 43 and therefore through the evaporator 6 via the outlet point 45. The second bypass 46 is closed.

Figure 3:
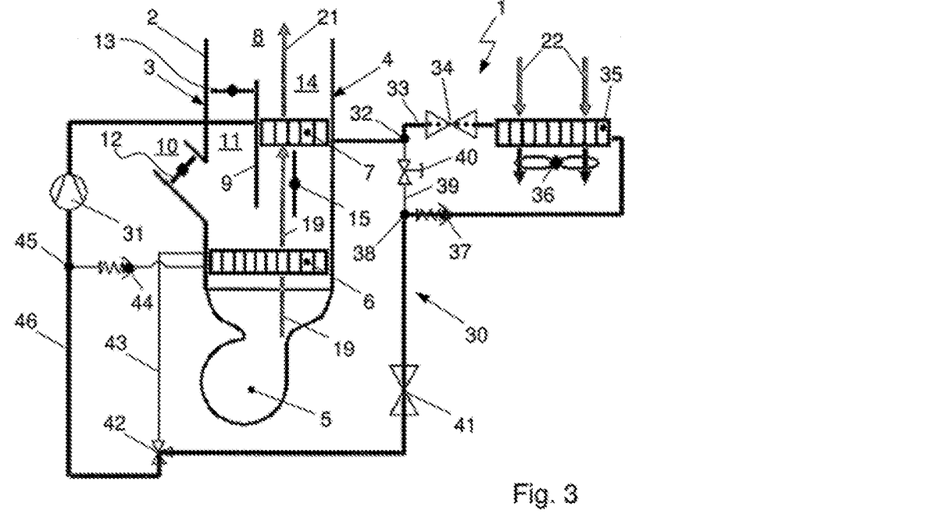

When operated in heat pump mode according to FIG. 3, meaning that the air channeled into the passenger compartment 8 is heated, the air flow devices 12, 13, and therefore the cold air flow paths 10, 11 are closed. The air flow device 15 is opened, so that the air mass flow that is taken in by the blower 5 is channeled through the warm air flow path 14 to the passenger compartment 8. No heat is transmitted in the evaporator 6.

The heat dissipated by the refrigerant in the condenser 7 is absorbed by the external heat exchanger 35, which is operated in heat pump mode as an evaporator. The heat exchanger 35 utilizes the ambient air as a heat source, which is channeled in the flow direction 22 over the heat exchanger surface of the heat exchanger 35.

In heat pump mode, the refrigerant circulation system 30 is set such that the stop valve 40 closes the first bypass 39. The refrigerant flows through the first refrigerant path 33. The first expansion element 34 is used for discharging the condensed refrigerant at an evaporating pressure.

The second expansion element 41 is fully opened, so that the refrigerant does not pass through a cross-sectional bottleneck and does not further discharge. The three-way valve 42 is set such that the refrigerant is taken in by the compressor 31 through the second bypass 46 via the outlet point 45. The second refrigerant path 43 is closed.

Figure 4:
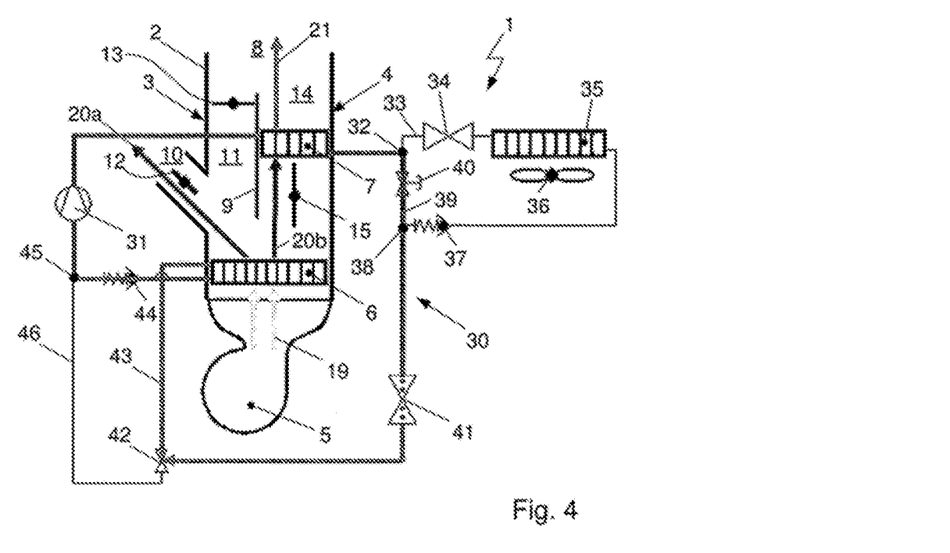

When operated in reheating mode according to FIG. 4, the air flow devices 12, 13, 15 can be set to different positions between fully opened and fully closed, as needed. Due to the positions of the air flow devices 12, 13, 15 and the rotational speed of the blower 5, the air mass flow that is to be heated varies. In the illustrated case, the air flow devices 12, 15 and therefore the cold air flow path 10 and the warm air flow path 14 are open, whereas the air flow device 13 and the cold air flow path 11 are closed.

The blower 5 propels the air mass flow that was taken in into the flow direction 19 towards the evaporator 6. When flowing over the heat exchanger surface of the evaporator 6, the air is cooled or dehumidified, respectively, and is then channeled in flow directions 20a, 20b as partial air mass flows.

When the air flow devices 13, 15 are open, the partial air mass flow that is reheated when flowing over the heat exchanger surface of the condenser 7 may be mixed with the partial air mass flow of the cold air mass flow flowing through the cold air flow path 11. Depending on the embodiment of a mixing chamber connected to the flow channels 3, 4 in the air flow direction, which is not shown here, and of the components arranged inside it, the partial air mass flows that are channeled through the cold air flow path 11 and the warm air flow path 14 may also be channeled into the passenger compartment 8 through air outlets without having been mixed. The partial air mass flow through the first flow channel 3, and therefore, the cold air flow path 11, can therefore be regulated through an adjustment of the air flow device 12. When the air flow device 12 is open, the partial air mass flow through the first flow channel 3 or through the cold air flow path 11, respectively, is reduced, depending on the setting of the air flow device 12.

When the air flow device 13 is closed, the air mass flow that is reheated when flowing over the heat exchanger surface of the condenser 7 is channeled in the flow direction 21 into the passenger compartment 8 without being mixed. A part of the cold air mass flow that was conditioned when flowing over the evaporator 6 is diverted by the open air flow device 12 in the flow direction 20a through the cold air flow path 10 into the surroundings of the air conditioning system 1.

The air conditioning system 1 with a heat pump functionality, meaning, the cooling and/or dehumidifying and the subsequent heating of the air mass flow, can be operated in the reheating mode, also known as reheating operation. The reheating mode is possible as a reheating-only operation, meaning: without the mixing in of unconditioned air. The totality of the air mass flow that is to be reheated may be cooled and/or dehumidified before being heated by flowing over the heat exchanger surface of the evaporator 6.

When operating in reheating mode, the refrigerant circulation system 30 is set such that the first expansion element 34 is closed, thereby closing off the first refrigerant path 33. The stop valve 40 is open, so that the refrigerant can be channeled through the first bypass 39 around the heat exchanger 35. The heat exchanger 35 is not charged with refrigerant.

The second expansion element 41 is used for discharging the refrigerant condensed in condenser 7 at an evaporating pressure. The three-way valve 42 is set such that the refrigerant is taken in by the compressor 31 through the second refrigerant path 43 and therefore through the evaporator 6 via the outlet point 45. The second bypass 46 is closed.

In order to heat the air, or respectively, in order to maintain the air temperature in the passenger compartment 8, the air conditioning system 1 is initially operated in heat pump mode according to FIG. 3. The air conditioning system 1 is then switched to reheating mode according to FIG. 4 before the heat exchanger surface of the heat exchanger 35 charged with air from the surroundings ices over.

This involves the opening of the stop valve 40, and therefore of the first bypass 39. The first refrigerant path 33 is closed. In addition, the three-way valve 42 is adjusted such that the second bypass 46 around the evaporator 6 is closed, and the second refrigerant path 43 is opened. The refrigerant flows through the evaporator 6, and absorbs heat as it flows through the evaporator 6. The blower 5 either sucks in circulating air from the already heated or preheated passenger compartment 8, or mixed air from the surroundings and from the preheated passenger compartment 8.

When the air conditioning system 1 is operated in an alternative mode, the refrigerant circulation system 30 is set such that the stop valve 40, and therefore the first bypass 39 around the first refrigerant path 33, is closed, and that the three-way valve 42 closes the second bypass 46 and opens the second refrigerant path 43. The refrigerant therefore flows through the first refrigerant path 33 with the heat exchanger 35, and is taken in by the compressor 31 through the second refrigerant path 43 and therefore through the evaporator 6 via the outlet point 45.

When flowing through the first expansion element 34, the condensed refrigerant is discharged at an evaporating pressure necessary in the heat exchanger 35. After exiting from the heat exchanger 35, the refrigerant is channeled to the second expansion element 41.

According to a first alternative operating method, the second expansion element 41 is further discharged at an evaporating pressure level different from the evaporating pressure level in the heat exchanger 35, so that the evaporator 6 is operated at a lower evaporating temperature than the heat exchanger 35. In a second alternative operating method, the second expansion element 41 is fully opened, so that the refrigerant does not pass through a cross-sectional bottleneck and does not further discharge. Disregarding undesired pressure losses, the evaporator 6 is operated here at the same evaporating pressure level as the heat exchanger 35.

The air flow devices 12, 13, 15 can be set to different positions between fully opened and fully closed, as needed.

Figure 5:
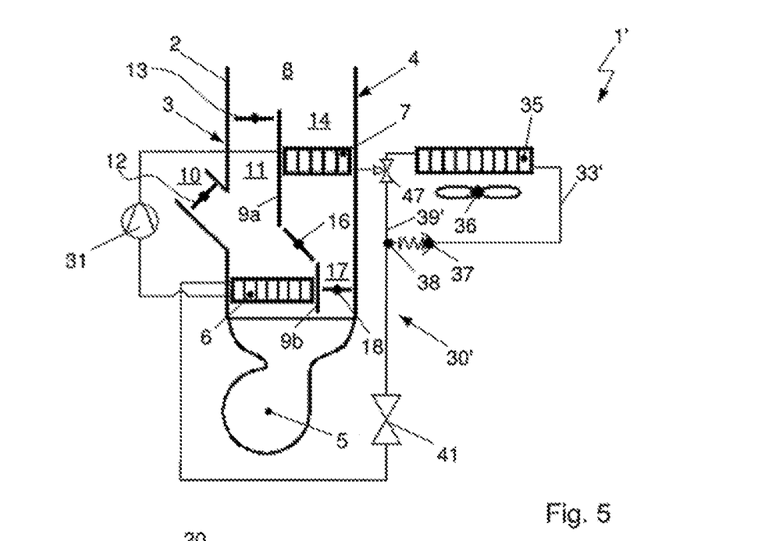

Whereas in FIG. 1 through FIG. 4, the air conditioning system 1 is shown with two air flow valves 13, 15 and one air outflow valve 12 in the cold air flow path 10, FIG. 5 shows the air conditioning system 1' with two air flow valves 13, 16, the air outflow valve 12 in the cold air flow path 10, as well as the bypass channel 17 around the evaporator 6 with a corresponding air flow device 18 embodied as an air flow valve.

Contrary to the embodiment according to FIG. 1, the evaporator 6 does not extend here across the entire flow area of the flow channels 3, 4. Rather, the flow area is divided into a region in which the evaporator 6 is positioned, and parallel to it a bypass channel 17. The bypass channel 17 can be closed by means of the air flow device 18.

The first and the second flow channel 3, 4 are separated from each other by a divided separation wall 9a, 9b. The first part of the separation wall 9a corresponds to separation wall 9 in FIG. 1. The second part of the separation wall 9b separates the bypass channel 17 from the evaporator 6. The two partial segments of the separation wall 9a, 9b are connected to each other via an air flow device 16 such that the air flow device 16, which is also embodied as an air flow valve, when closed and in connection with the segments of the separation wall 9a, 9b, closes of the flow between the first and the second flow channels 3, 4.

In the flow direction of the refrigerant, the refrigerant circulation system 30' features a compressor 31, the condenser 7, as well as a branch embodied as a three-way valve 47. Departing from the three-way valve 47, the refrigerant path 33' with the heat exchanger 35 with a blower 36 located outside of the enclosure 2, as well as a first check valve 37, extends until the outlet point 38. Between the three-way valve 47 and the outlet point 38, a bypass 39' is embodied parallel to the refrigerant path 33'.

In the flow direction of the refrigerant, after the outlet point 38, the refrigerant circulation system 30' also features an expansion element 41 which can be operated as an expansion device, as well as the evaporator 6. The compressor 31 is located downstream from the evaporator 6. The refrigerant circulation system 30' is closed.

Figure 6:
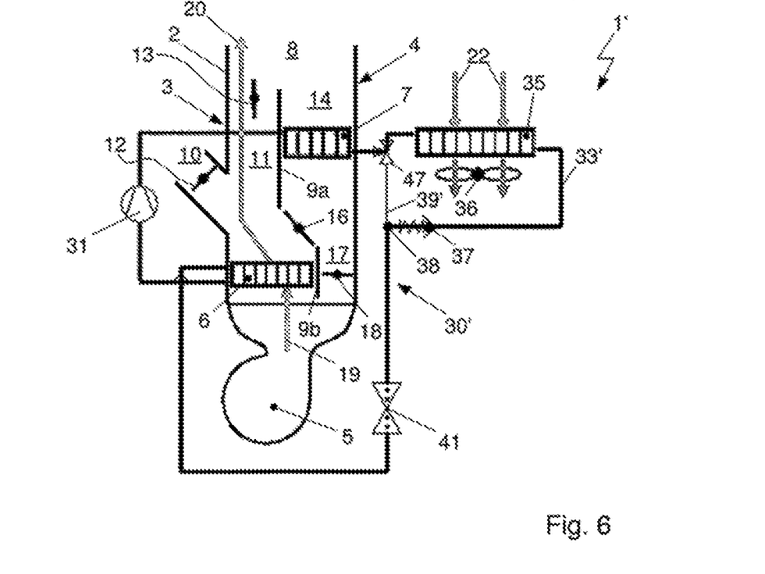

When operated in cooling mode according to FIG. 6, the air flow devices 12, 16, 18, and therefore the cold air flow path 10 as well as the warm air flow path 14 are closed. The air flow device 13 and therefore the cold air flow path 11 are opened, so that air mass flow that is propelled by the blower 5 in the flow direction 19 and which is conditioned when flowing over the evaporator 6 is channeled in flow direction 20 through the open cold air flow path 11 to the passenger compartment 8. The heat absorbed from the evaporation of the refrigerant is dissipated in the heat exchanger 35 that located outside of the air conditioning system 1' which is operated as a condenser.

The heat exchanger 35 utilizes the ambient air as a heat sink. The blower 36 may be used as needed, for instance in a stationary vehicle or when the airstream is insufficient, in order to propel the air mass flow flowing in the flow direction 22.

In cooling mode, the refrigerant circulation system 30' is set such that the three-way valve 47 closes the bypass 39'. The refrigerant flows through the refrigerant path 33'.

When flowing through the expansion element 41, the condensed refrigerant is discharged at an evaporating pressure, and taken in by the compressor 31 and channeled through the evaporator 6.

Figure 7:
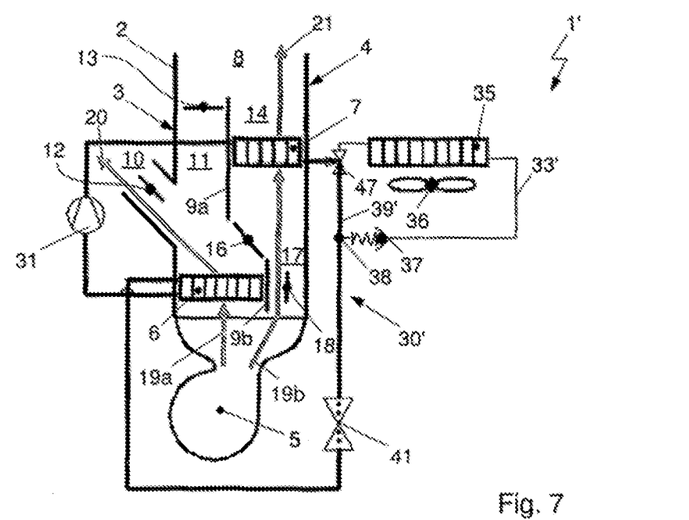

When operated in heat pump mode according to FIG. 7, meaning a heating-only operating mode and that the air channeled into the passenger compartment 8 is heated, the air flow devices 13, 16, and therefore the cold air flow path 11 are closed. The air flow devices 12, 18 and therefore the cold air flow path 10 and the bypass channel 17 are opened, so that the first partial air mass flow that is propelled by the blower 5 in flow direction 19a, when flowing over the evaporator 6, dissipates heat to the refrigerant, and is then channeled in flow direction 20 via the cold air flow path 10 into the surrounding of the air conditioning system 1'. The air mass flow channeled via the evaporator 6 that consists of circulating air from the passenger compartment 8, fresh air from the surroundings, or a mixture of circulating air and fresh air, serves here as a heat source. A second partial air mass flow is channeled in flow direction 19b through the bypass channel 17 to the condenser 7, where it absorbs heat, and is then channeled into the passenger compartment 8.

The heating-only operation with unconditioned air is activated when a dehumidification of the air channeled into the passenger compartment 8 is not necessary or not desired.

In heat pump mode, the refrigerant circulation system 30' is set such that the three-way valve 47 closes off the refrigerant path 33'. The refrigerant flows through the bypass 39'. When flowing through the expansion element 41, the condensed refrigerant is discharged at an evaporating pressure, and taken in by the compressor 31 and channeled through the evaporator 6.

Since in heat pump mode no heat needs to be absorbed in the external heat exchanger 35, the icing of the heat exchanger surface of the heat exchanger 35 is avoided.

Figure 8:
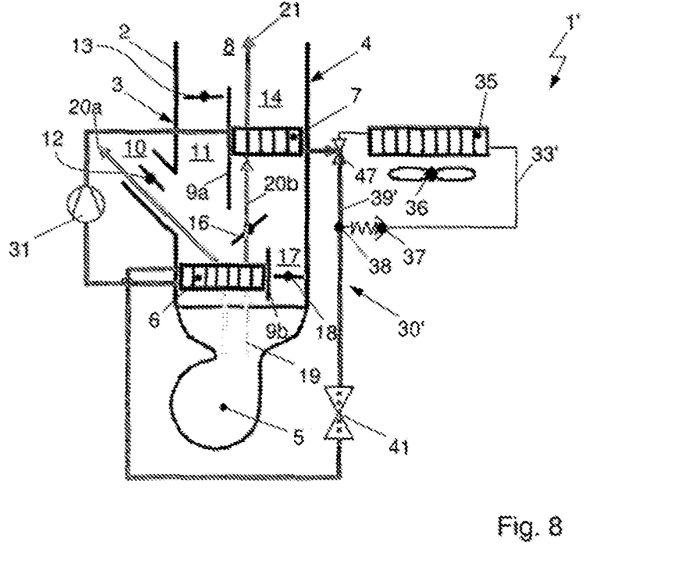

When operated in reheating mode according to FIG. 8, the air flow devices 12, 13, 16, 18 can be set to different positions between fully opened and fully closed, as needed. Due to the positions of the air flow devices 12, 13, 16, 18 and the rotational speed of the blower 5, the air mass flow that is to be heated varies. In the illustrated case, the air flow devices 12, 16 and therefore the cold air flow path 10 are open, whereas the air flow devices 13, 18 and therefore the cold air flow path 11 and the bypass channel 17 are closed.

The blower 5 propels the air mass flow that was taken in into the flow direction 19 towards the evaporator 6. When flowing over the heat exchanger surface of the evaporator 6, the air is cooled or dehumidified, respectively, and is then channeled in flow directions 20a, 20b as partial air mass flows.

When the air flow devices 13, 16 are open, the partial air mass flow that is reheated when flowing over the heat exchanger surface of the condenser 7 may be mixed with the partial air mass flow of the cold air mass flow flowing through the cold air flow path 11. Depending on the embodiment of a mixing chamber connected to the flow channels 3, 4 in the air flow direction, which is not shown here, and of the components arranged inside it, the partial air mass flows that are channeled through the cold air flow path 11 and the warm air flow path 14 may also be channeled into the passenger compartment 8 through air outlets without having been mixed. The partial air mass flow through the first flow channel 3, and therefore, the cold air flow path 11, can therefore be regulated through an adjustment of the air flow device 12. When the air flow device 12 is open, the partial air mass flow through the first flow channel 3 or through the cold air flow path 11, respectively, is reduced, depending on the setting of the air flow device 12.

When the air flow device 13 is closed and the air flow device 16 is open, the partial air mass flow that is channeled in flow direction 20b and reheated when flowing over the heat exchanger surface of the condenser 7 is channeled in flow direction 21 into the passenger compartment 8 without being mixed. A part of the cold air mass flow that was conditioned when flowing over the evaporator 6 is diverted by the open air flow device 12 in the flow direction 20a through the cold air flow path 10 into the surroundings of the air conditioning system 1.

The air conditioning system 1' with a heat pump functionality, meaning, the cooling and/or dehumidifying and the subsequent heating of the air mass flow, can be operated in the reheating mode, also known as reheating operation. The reheating mode is possible as a reheating-only operation, meaning: without the mixing in of unconditioned air. The totality of the air mass flow that is to be heated may be cooled and/or dehumidified before being heated by flowing over the heat exchanger surface of the evaporator 6.

When operating in reheating mode, as also in the heat pump mode, the refrigerant circulation system 30' is set such that the three-way valve 47 closes off the refrigerant path 33'. The refrigerant flows through the bypass 39'. When flowing through the expansion element 41, the condensed refrigerant is discharged at an evaporating pressure, and taken in by the compressor 31 and channeled through the evaporator 6.

In order to heat the air, or respectively, in order to maintain the air temperature in the passenger compartment 8, the air conditioning system 1' is initially operated in heat pump mode according to FIG. 7. The blower 5 sucks in air from the surroundings.

The partial air mass flow that was cooled and/or dehumidified when flowing over the evaporator 6 is channeled in flow direction 20 into the surroundings.

The partial air mass flow that was channeled through bypass channel 17 around the evaporator 6 is heated when flowing over the condenser 7 and channeled into the passenger compartment 8. The air in the passenger compartment 8 is heated.

When the air in the passenger compartment 8 has reached a satisfactory and preset value, the air conditioning system 1' is switched to operating in reheating mode. The blower 5 will now preferentially take in an air mixture of circulating air from the passenger compartment 8 and of ambient air. The air flow device 18 and therefore the bypass channel 17 are closed, and the air flow device 16 that is positioned between the first flow channel 3 and the second flow channel 4 is opened. Switching between the operating modes is done exclusively via the controls of the air flow devices 16, 18.

Figure 9:
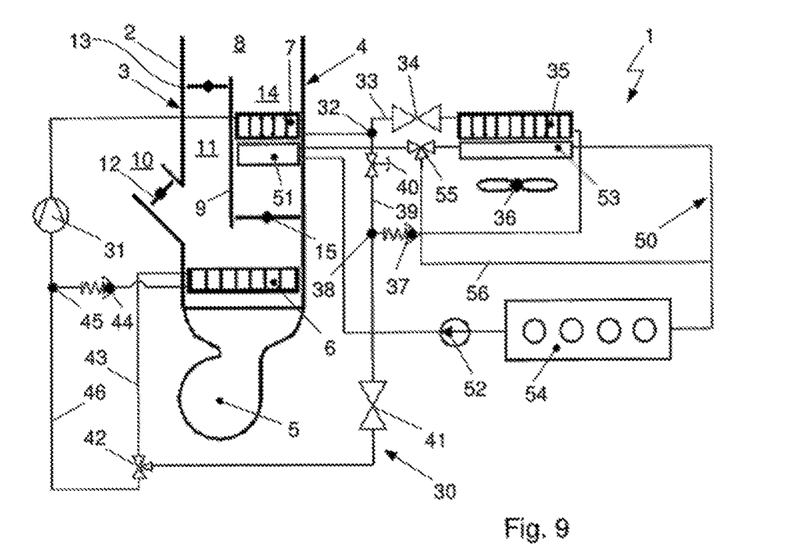
FIG. 9: according to FIG. 1, in combination with a coolant circulation system with a heating heat exchanger in the second flow channel.
Figure 10:
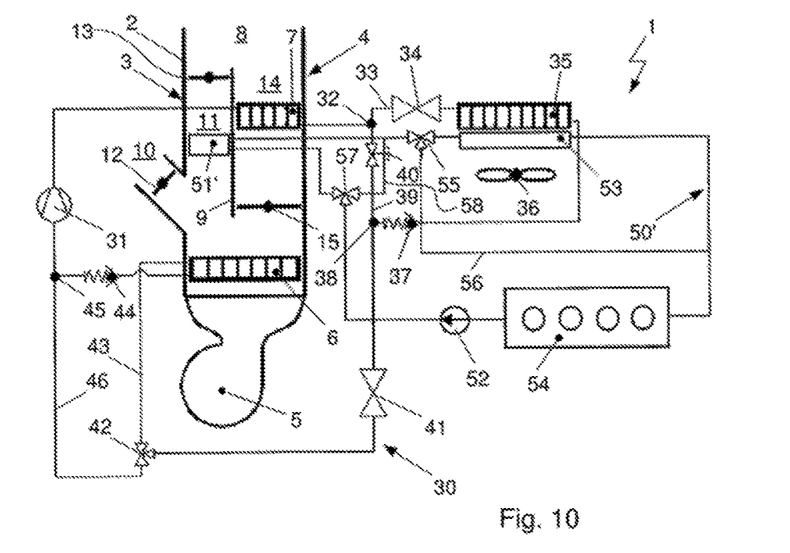
FIG. 10: according to FIG. 1, in combination with a coolant circulation system with a heating heat exchanger in the first flow channel.

FIG. 9 and FIG. 10 show the air conditioning system 1 with the refrigerant circulation system 30 according to FIG. 1 through FIG. 4, respectively in combination with a coolant circulation system 50, 50'.

The coolant circulation system 50, 50' features a heat exchanger 51, 51' in the enclosure 2 for transferring heat from the coolant to the air channeled into the passenger compartment 8. The coolant is circulated by means of a propelling device 52, specifically a pump, through the coolant circulation system 50, 50', through which it circulates between the heat exchanger 51, 51', a coolant-air heat exchanger 53, and a coolant heat source 54. The coolant-air heat exchanger 53 is positioned outside the enclosure 2 serially with the heat exchanger 35 of the refrigerant circulation system 30, and it utilizes the ambient air as a heat sink. The arrangement of the coolant-air heat exchanger 53 at the front of the vehicle makes it possible for the heat transfer surface to take in the airstream, which improves the heat transfer process without the need for additional components, such as the blower 36. Operation of the blower 36 may be added as needed, however, for instance in a stationary vehicle, in order to propel the air mass flow necessary for the cooling of the coolant. Depending on the operating mode of the motor vehicle or of the air conditioning system 1, respectively, and in particular of the coolant circulation system 50, 50', the coolant may also be channeled by a three-way valve 55 through a bypass 56 around the coolant-air heat exchanger 53, so that the coolant does not charge the coolant-air heat exchanger 53.

When flowing through the coolant heat source 54, which may be embodied as a radiator or as a battery cooler, the coolant absorbs heat.

In the system in FIG. 9, the heat exchanger 51 is located inside the second flow channel 4, and positioned on the air side serially to the condenser 7. The heat exchanger 51 is positioned ahead of the condenser 7 in the direction of the air flow through the second flow channel 4.

When the air conditioning system 1 is operated in cooling mode, comparable to what is shown in FIG. 2, the air flow device 15 of the warm air flow path 14 is closed, so that the heat exchanger 51 is not charged with air. Consequently, the coolant flows through the heat exchanger 51 without dissipating heat. The heat is transferred in the coolant-air heat exchanger 53 to the ambient air.

When the air conditioning system 1 is operated in heat pump mode or in reheating mode, comparable to what is shown in FIG. 3 and FIG. 4, the air flow device 15 of the warm air flow path 14 is open, so that the heat exchanger 51 is charged with air and transfers heat to the air channeled into the passenger compartment 8. The heat transferred from the refrigerant in the condenser 7 to the air channeled into the passenger compartment 8 is reduced, so that when operating in heat pump mode, the heat exchanger 35, which operates as an evaporator, absorbs less heat. The risk of icing of the heat transfer surface of the heat exchanger 35 is further reduced.

In the system in FIG. 10, the heat exchanger 51' is located inside the first flow channel 3. Depending on the operating mode of the coolant circulation system 50', the coolant may be channeled via a three-way valve 57 through a bypass 58 around the heat exchanger 51', so that the coolant does not charge the heat exchanger 51'. In the heat exchanger 51', no heat is transferred to the air channeled into the passenger compartment 8.

Figure 11:
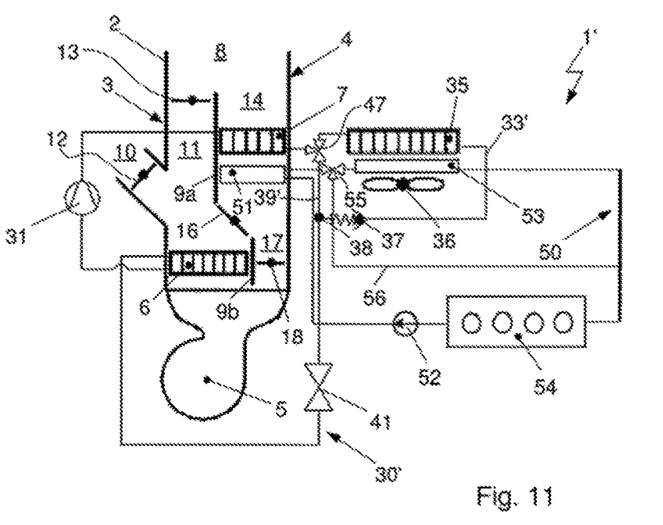
FIG. 11: according to FIG. 5, in combination with a coolant circulation system with a heating heat exchanger in the second flow channel.
Figure 12:
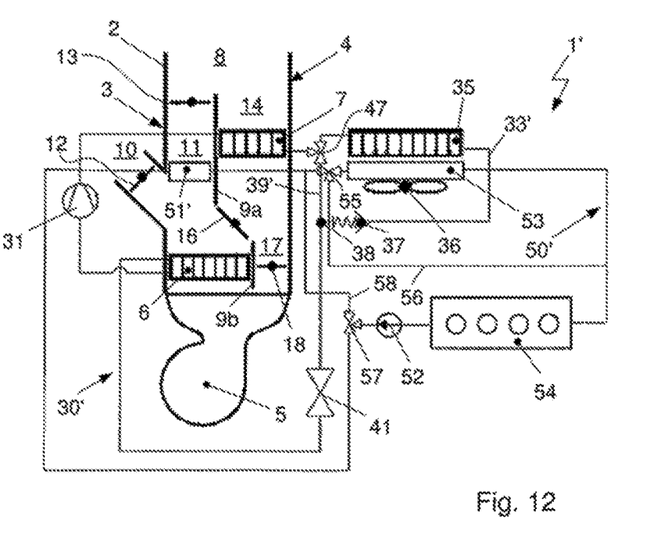
FIG. 12: according to FIG. 5, in combination with a coolant circulation system with a heating heat exchanger in the first flow channel.

FIG. 11 and FIG. 12 show the air conditioning system 1' with the refrigerant circulation system 30' according to FIG. 5 through FIG. 8, respectively in combination with a coolant circulation system 50, 50'. The coolant circulation system 50, 50' is embodied here according to what is shown in FIG. 9 and FIG. 10, respectively.

In the system in FIG. 11, the heat exchanger 51 is located inside the second flow channel 4, and is positioned on the air side serially to the condenser 7. The heat exchanger 51 is positioned ahead of the condenser 7 in the direction of the air flow through the second flow channel 4.

When the air conditioning system 1 is operated in cooling mode, comparable to what is shown in FIG. 6, the air flow devices 16, 18 are closed, so that the heat exchanger 51 is not charged with air. The coolant flows through the heat exchanger 51 without dissipating heat. The heat is only transferred in the coolant-air heat exchanger 53 to the ambient air.

When the air conditioning system 1 is operated in heat pump mode or in reheating mode, comparable to what is shown in FIG. 7 and FIG. 8, the air flow device 18 and/or the air flow device 16 is open, so that the heat exchanger 51 is charged with air and transfers heat to the air channeled into the passenger compartment 8. The heat transferred from the refrigerant in the condenser 7 to the air channeled into the passenger compartment 8 is reduced.

Figure 13:
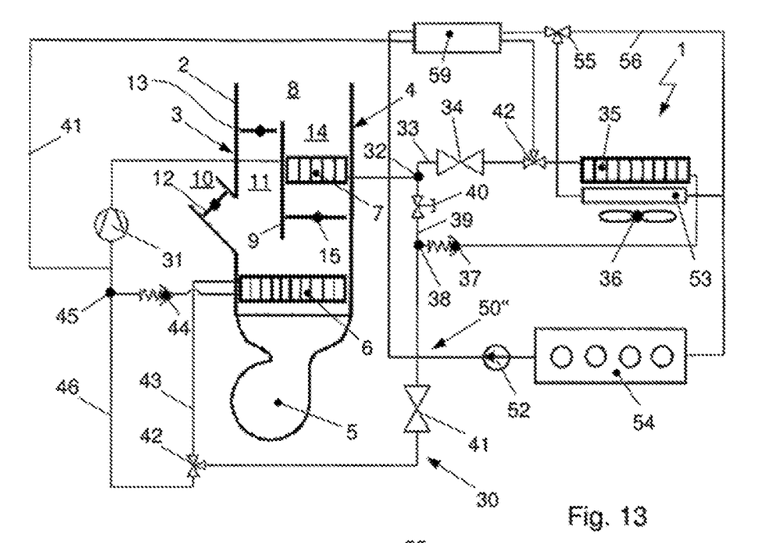
FIG. 13: according to FIG. 1, in combination with a coolant circulation system with an additional refrigerant-coolant-heat exchanger.
Figure 14:
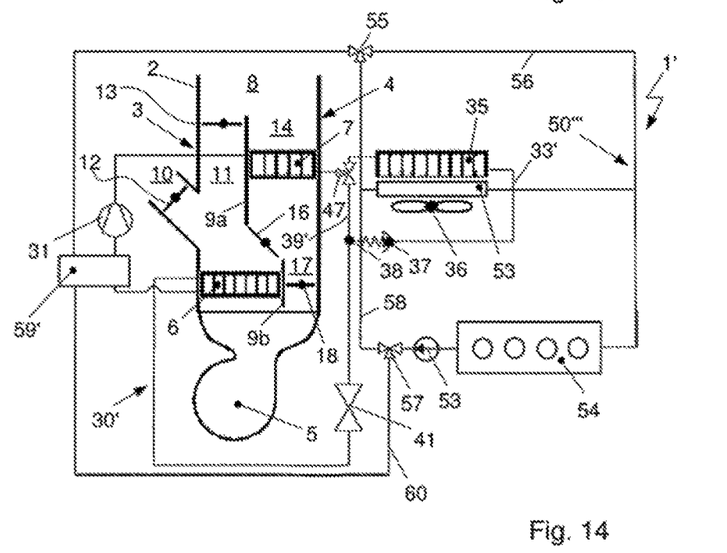
FIG. 14: according to FIG. 5, in combination with a coolant circulation system with an additional refrigerant-coolant-heat exchanger.

FIG. 13 and FIG. 14 show the air conditioning system 1, 1' with the refrigerant circulation system 30, 30' according to FIG. 1 through FIG. 4, and according to FIG. 5 through FIG. 8, respectively, in each case with an additional refrigerant-coolant heat exchanger 59, 59', in combination with a coolant circulation system 50", 50'".

The coolant circulation system 50", 50'" features a refrigerant-coolant heat exchanger 59, 59' outside of the enclosure 2 for transferring heat from the coolant to the refrigerant. The refrigerant-coolant heat exchanger 59, 59' is operated as an evaporator of the refrigerant, and utilizes the refrigerant as a heat sink. The refrigerant-coolant heat exchanger 59, 59' for the dissipation of heat from electronic or electric components such as the battery of the motor vehicle engine is also known as a chiller.

The coolant is circulated by means of a propelling device 52, specifically a pump, through the coolant circulation system 50", 50'", and circulates between the refrigerant-coolant heat exchanger 59, 59', the coolant-air heat exchanger 53, and the coolant heat source 54. Depending on the operating mode, the coolant may also be channeled by a three-way valve 55 through a bypass 56 around the coolant-air heat exchanger 53, so that the coolant does not charge the coolant-air heat exchanger 53.

The refrigerant-coolant heat exchanger 59, 59' is always positioned in the refrigerant circulation system 30, 30' on the suction side of the compressor 31.

In the system in FIG. 13, the refrigerant-coolant heat exchanger 59 is located on the refrigerant side in a refrigerant path 48. The refrigerant path 48 extends from a three-way valve 49 until the inlet to the compressor 31, with the three-way valve 49 being located in the refrigerant path 33 between the expansion element 34 and the heat exchanger 35.

When the air conditioning system 1 is operated in cooling mode, comparable to what is shown in FIG. 2, the three-way valve 49 is set to close the refrigerant path 48. The refrigerant does not flow through the refrigerant-coolant heat exchanger 59. The heat absorbed from the coolant is transferred in the coolant-air heat exchanger 53 to the ambient air.

When the air conditioning system 1 is operated in heat pump mode or in reheating mode, comparable to what is shown in FIG. 3 and FIG. 4, the refrigerant-coolant heat exchanger 59 may be charged with refrigerant in order to transfer heat to the refrigerant. In particular when operating in heat pump mode, the heat exchanger 35, which operates as an evaporator, absorbs less heat, so that the risk of icing of the heat transfer surface of the heat exchanger 35 is further reduced.

In the system in FIG. 14, the refrigerant-coolant heat exchanger 59' is located on the coolant side in a coolant path 60. The coolant path 60 extends from a three-way valve 57 until the three-way valve 55. The three-way valve 55 at the inlet to the coolant-air heat exchanger 53 is designed to open and close the bypass 56 around the coolant-air heat exchanger 53.

When the air conditioning system 1' is operated in cooling mode, comparable to what is shown in FIG. 5, the three-way valves 55, 57 are set to close the coolant path 60. The refrigerant does not flow through the refrigerant-coolant heat exchanger 59'. The heat absorbed from the coolant is transferred in the coolant-air heat exchanger 53 to the ambient air.

When the air conditioning system 1' is operated in heat pump mode or in reheating mode, comparable to what is shown in FIG. 7 and FIG. 8, the refrigerant-coolant heat exchanger 59' may be charged with refrigerant in order to transfer heat to the refrigerant.

In embodiments not shown here, on the one hand, the refrigerant circulation system 30 of the air conditioning system 1 may also be embodied in air conditioning system 1' instead of refrigerant circulation system 30'. The embodiment of the refrigerant circulation system 30 pertains specifically to the arrangement inside the enclosure 2 with the bypass channel 17, the separation wall 9b, and the air flow devices 16, 18, instead of the air flow device 15.

On the other hand, the refrigerant circulation system 30' of the air conditioning system 1' may also be embodied in air conditioning system 1 instead of refrigerant circulation system 30. The embodiment of the refrigerant circulation system 30' pertains specifically to the arrangement inside the enclosure 2 with the air flow device 15, in which the evaporator 6 extends over the entire flow area, instead of the embodiment with the bypass channel 17, the separation wall 9b, and the air flow devices 16, 18.

REFERENCE LIST

1, 1' air conditioning system
2 enclosure
3 first flow channel
4 second flow channel
5 blower
6 evaporator
7 first condenser
8 passenger compartment
9, 9a, 9b separation wall
10, 11 cold air flow path
12, 13 air flow device/valve of the cold air flow path 11, 12
14 warm air flow path
15 air flow device/valve of the warm air flow path 14
16 air flow device/valve between the first flow channel 3 and the second flow channel 4
17 bypass channel around the evaporator 6
18 air flow device/valve of the bypass channel 17
19 flow direction of the taken-in air mass flow
19a, 19b flow direction of the taken-in air mass flow
20 flow direction of the cooled/dehumidified air mass flow
20a, 20b flow direction of the cooled/dehumidified air mass flow
21 flow direction of the heated air mass flow
22 flow direction of the heat exchanger 35 air mass flow
30, 30' refrigerant circulation system
31 compressor
32 branch
33, 33' (first) refrigerant path
34 (first) expansion element
35 heat exchanger
36 blower of the heat exchanger 35
37 (first) check valve
38, 45 outlet point
39, 39' (first) bypass
40 stop valve
41 second expansion element
42, 47, 49 three-way valve
43 second refrigerant path
44 second check valve
46 second bypass
48 refrigerant path
50, 50' coolant circulation system with heating heat exchanger
50", 50''' coolant circulation system with chiller
51, 51' heat exchanger
52 propelling device
53 coolant-air heat exchanger
54 coolant heat source
55, 57 three-way valve
56, 58 bypass
59, 59' refrigerant-coolant heat exchanger
60 coolant path

What is claimed is:

1. An air conditioning system for conditioning air of a passenger compartment of a motor vehicle, the air conditioning system operable in a cooling mode, a heat pump mode, and a reheating mode, the air conditioning system comprising:

an enclosure with a first flow channel and a second flow channel conducting air, the first flow channel including a first cold air flow path extending through the first flow channel to the passenger compartment and a second cold air flow path extending through the first flow channel to surroundings of the enclosure; and a refrigerant circulation system including a heat exchanger operable as an evaporator, a heat exchanger operable as a condenser, the heat exchanger operable as the evaporator and the heat exchanger operable as the condenser located inside the enclosure, the refrigerant circulation system further including a heat exchanger located outside of the enclosure and inside of a refrigerant path, and an expansion element disposed in the refrigerant circulation system upstream from the heat exchanger operable as the evaporator in a flow direction of a refrigerant, wherein the refrigerant circulation system includes a first bypass positioned parallel to the refrigerant path to channel the refrigerant around the heat exchanger located outside of the enclosure as needed, wherein the second cold air flow path includes an air flow device for opening and closing between a fully open or a fully closed position during the reheating mode, and wherein the air flow device of the second cold air flow path is closed in the cooling mode and the heat pump mode.

2. The air conditioning system according to claim 1, wherein the first cold air flow path and the second cold air flow path are positioned in the first flow channel downstream from the heat exchanger operable as the evaporator in an air flow direction, wherein a conditioned air mass flow channeled through the first flow channel can be divided into partial air mass flows including a first partial air mass flow channeled through the first cold air flow path into the passenger compartment and a second partial air mass flow channeled through the second cold air flow path into surroundings of the enclosure.

3. The air conditioning system according to claim 1, wherein the enclosure includes a bypass channel around the heat exchanger operable as the evaporator, the bypass channel including an air flow device for opening and closing, and wherein an air mass flow propelled by a blower is channeled around the heat exchanger operable as the evaporator when the air flow device of the bypass channel is open.

4. The air conditioning system according to claim 1, wherein the heat exchanger operable as the evaporator covering an entire cross-section flow area of the enclosure is positioned before an entrance into the first flow channel and an entrance into the second flow channel, and wherein an air mass flow propelled by a blower is channeled around the heat exchanger operable as the evaporator.

5. The air conditioning system according to claim 1, wherein the refrigerant circulation system includes a second bypass disposed to channel the refrigerant around the heat exchanger operable as the evaporator, and wherein the refrigerant can be channeled around the heat exchanger operable as the evaporator as needed.

6. The air conditioning system according to claim 1, wherein the refrigerant path includes an expansion element positioned upstream from the heat exchanger located outside of the enclosure in the flow direction of the refrigerant.

7. The air conditioning system according to claim 3, wherein the heat exchanger located outside of the enclosure can be operated as an evaporator.

8. The air conditioning system according to claim 1, further comprising a coolant circulation system with a heat exchanger for transfer of heat from a coolant to air channeled into the passenger compartment, the heat exchanger for transfer of heat from the coolant positioned in the second flow channel of the enclosure.

9. The air conditioning system according to claim 1, further comprising a coolant circulation system with a heat exchanger for transfer of heat from a coolant to air channeled into the passenger compartment, the heat exchanger for transfer of heat from the coolant positioned in the first flow channel of the enclosure.

10. The air conditioning system according to claim 1, further comprising a coolant circulation system with a refrigerant-coolant heat exchanger for transfer of heat from a coolant to the refrigerant.

\* \* \* \* \*